United States Patent
Wang et al.

[11] Patent Number: 5,875,185
[45] Date of Patent: Feb. 23, 1999

[54] SEAMLESS HANDOFF FOR A WIRELESS LAN/WIRED LAN INTERNETWORKING

[75] Inventors: Yao-Tzung Wang, Hsin Chu; Tzung-Pao Lin, Kaohsiung; Nen-Fu Huang, Hsin Chu, all of Taiwan

[73] Assignee: Industrial Technology Research Inst., Taiwan

[21] Appl. No.: 544,386

[22] Filed: Oct. 10, 1995

[51] Int. Cl.[6] ............................................. H04J 3/12
[52] U.S. Cl. ....................... 370/331; 370/338; 370/384; 455/440; 455/445
[58] Field of Search .................... 370/310, 313, 370/315, 328, 338, 331, 352, 353, 354, 355, 356, 362, 357, 386, 389, 392, 395, 396, 397, 400, 401, 402, 409, 384, 351, 360; 455/33.2, 54.1, 54.2, 56.1, 432, 433, 436, 437, 438, 439, 440, 442, 443, 444, 445; 379/58, 59, 60; 340/826, 827

[56] References Cited

U.S. PATENT DOCUMENTS

| | | | |
|---|---|---|---|
| 4,745,593 | 5/1988 | Stewart | 370/400 |
| 5,371,738 | 12/1994 | Moelard et al. | 370/338 |
| 5,487,065 | 1/1996 | Acampora et al. | 370/397 |
| 5,539,744 | 7/1996 | Chu et al. | 370/397 |
| 5,590,125 | 12/1996 | Acampora et al. | 370/397 |
| 5,590,126 | 12/1996 | Mishra | 370/397 |
| 5,623,495 | 4/1997 | Eng et al. | 370/338 |

OTHER PUBLICATIONS

Goodman et al., "Network Control for Wireless Communications," Dec. 1992, pp. 116–121, IEEE Communication Magazine.

*Primary Examiner*—Huy D. Vu
*Attorney, Agent, or Firm*—Proskauer Rose LLP

[57] ABSTRACT

An exclusive VCC is maintained between each two communicating work stations (MT pair). The handoff method differs if the MT moves to a coverage area having a base station connected to the same switch as the previous coverage area (intra-switch mobility) or to a coverage area having a base station connected to a different switch than the previous coverage area (inter-switch mobility). In intra-switch mobility, the switch changes the path directly to the new base station and eliminates the path through the original base station. In inter-switch mobility, the switch performs the path set-up. The path may be elongated from the switch connected to the original BS, to the new BS, rather than from the original BS to the new BS. This eliminates the path through the original base station. The exclusive VCC between the MT pair permits path elongation to be minimized.

8 Claims, 12 Drawing Sheets

| BS60aMT PAIR-VCC DATABASE (MVD) |
|---|
| MT (a,c) - 60/100 |
| MT (b,c) - 60/200 |
| MT (a,d) - 60/300 |

| BS60eMT PAIR-VCC DATABASE (MVD) |
|---|
| MT (a,c) - 10/700 |
| MT (b,c) - 10/800 |
| MT (a,d) - 10/900 |

SWITCH 54's ROUTING DATABASE (SRD)

| IN-VCC | IN-PORT | OUT-VCC | OUT-PORT |
|---|---|---|---|
| 60/100 | 0 | 30/400 | 2 |
| 30/400 | 2 | 60/100 | 0 |
| 60/200 | 0 | 30/500 | 2 |
| 30/500 | 2 | 60/200 | 0 |
| 60/300 | 0 | 30/600 | 2 |
| 30/600 | 2 | 60/300 | 0 |

SWITCH 56's ROUTING DATABASE (SRD)

| IN-VCC | IN-PORT | OUT-VCC | OUT-PORT |
|---|---|---|---|
| 30/400 | 0 | 10/700 | 2 |
| 10/700 | 2 | 30/400 | 0 |
| 30/500 | 0 | 10/800 | 2 |
| 10/800 | 2 | 30/500 | 0 |
| 30/600 | 0 | 10/900 | 2 |
| 10/900 | 2 | 30/600 | 0 |

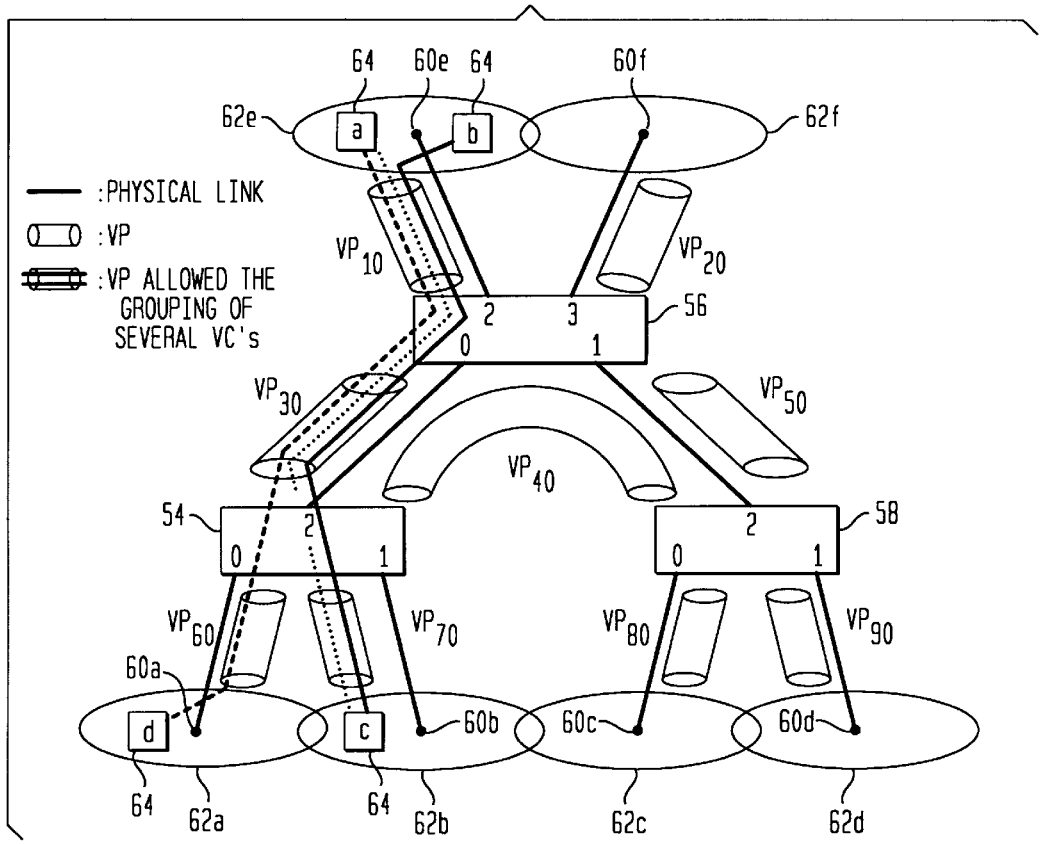

SEAMLESS HANDOFF FOR A WIRELESS LAN/WIRED LAN INTERNETWORKING

FIELD OF THE INVENTION

The present invention is directed to a method for improving the mobility of work stations on a wireless local area network (WLAN) and, more particularly, to a method for seamlessly handing off communications in a WLAN between base station coverage areas.

BACKGROUND OF THE INVENTION

Wireless local area networks (WLANs) comprise a network of wireless work stations which communicate with each other and a central file server via wireless communication. Because no wire connects the work stations to the network, a WLAN network is easier to install than conventional wired local area networks (LAN) and allows the work stations to be mobile. WLANs may be used, for example, in retail stores and factories, using palmtop computers as work stations to track inventory and the like. Another use is in hospitals, where wireless work stations may be taken to each patient's bed to keep track of medications given, vital signs, etc. One limitation of WLANs is that they are limited to a total network area of only several hundred yards. In order to increase the coverage of a WLAN, one or more WVLANs may be connected via an interface to a conventional wired LAN. This connection allows WLANs to cover larger areas, such as several floors in a building.

FIG. 1 illustrates a network 50 comprising a WLAN connected to a wired LAN. In this illustration, the wired LAN 52 is preferably an asynchronous transfer mode (ATM) network. ATM networks are preferred because they provide sufficient network bandwidth and easily integrate with existing networks, such as telephone and database networks. A person skilled in the art understands, however, that wired LANS using other protocols are also suitable. The LAN 52 has one or more switches 54, 56, 58 physically connected to it. Each switch 54, 56, 58 is physically connected to a base station (BS) 60a–60f. The base stations 60 are the interfaces between the LAN and WLAN. Each base station 60 defines an area of wireless communication coverage called a coverage area (represented in FIG. 1 as a circle) 62a–62f. A wireless work station, also called a mobile terminal (MT) 64, may be in wireless communication with the base station 60 covering the coverage area 62 in which the MT 64 is located. If the MT 64 travels from one coverage area to another, the network must be able to reroute communications to that MT 64 at its new location. This rerouting, known as a handoff, is preferably seamless, e.g., not apparent to the network users. The following three rules should be met for seamless handoffs:

(1) the data continuity should not be interrupted;
(2) the handoff should be transparent to other users; and
(3) the handoff should add only minimum loading to the network.

One method satisfying the first two rules is proposed in Goodman, et al., "Network Control for Wireless Communications," IEEE Comm. Mag. 116–24 Dec. 1992. This paper proposes a "path elongation" method.

This path elongation method provides for designating a virtual channel connection (VCC) between each pair of base stations in the WLANs and/or LANs (e.g., both wireless and wired networks). In known methods, a VCC is a virtual connection between two end stations (e.g., base stations). In an ATM system, a VCC is established before data is transmitted. An example of this method is as follows. A first MT wants to transmit a communication to a second MT. The second MT is moving from one coverage area to another, thus a handoff should be made. At the time of a handoff, the first MT transmits a wireless transmission to its current BS. This transmission is in a frame format used in wireless communications. The first MT's base station translates the communication from the frame format into a cell format used in ATM communications. The BS in which the second MT was just previously located receives the communication and translates it from a cell to a frame format. The previous BS is aware that the second recipient MT has moved to a new location. The BS translates the communication from the frame to the cell format and transfers the communication to the second MT's new BS along a newly established VCC between the base stations. The second MT's new BS then reassembles the cell format communication into a frame format communication and transmits it to the second MT.

When the second MT enters a new coverage area, it changes the database inside itself to reflect the new BS as the one in which it is currently located. The second MT also notifies the new BS of the identity of the previous BS. The new BS acknowledges the MT and adds it to a database it has of MT's for which it is responsible and begins to route communications to the MT accordingly. The new BS also informs the old BS that the MT is now located within its coverage area and may be reached through the new BS. The old BS then adjusts its database to forward any communications it receives for the second MT to the new BS. The new BS acknowledges to the second MT that the handoff is complete.

With this method, the elongation of the data path increases with increased terminal mobility. This elongation of the data path is seen with reference to FIG. 2 which shows a more complicated WLAN and LAN network 50'. This network includes six switches 54 (switches A–F). Three base stations 60g, 60h, and 60i are shown connected to switch C. One base station 60k is shown connected to switch F. The communication path 66 between $MT_g$, initially located in coverage area 62g and $MT_k$ located in coverage area 62k is from BS 60g→switch C→switch A→switch F→BS 60k. As MT 64g moves through different coverage areas, the path 66 becomes increasingly elongated. As seen in FIG. 2, MT 64g moves from coverage area 62g through 62h and 62i and ends in 62j. BS $60_j$, which covers coverage area 62j, is connected to switch D. The path 66 becomes increasingly large (e.g., elongated) with each move in FIG. 2. (Note that the path 66 enters and exits switch C four times). Each time the communication is received by a BS, the communication is translated from the ATM cell format to the wireless transmission frame format. When the BS determines that the communication is not to be transmitted into the coverage area, but rather forwarded to another BS, the BS translates the communication back to the cell format and forwards it. The increased communication path 66 of this elongation method violates the third rule above, because it leads to delay, bandwidth waste, and other disadvantages contrary to the needs of high speed network transmission.

At the January 1995 ATM Forum, a regulation for "LAN Emulation Over ATM: Version 1.0 Specification" was developed. The Goodman et al. path elongation method complies with this regulation. The basic principle of LAN emulation (LE) is establishing a VCC between each base station pair so that all of the work stations on the ATM LAN and WLAN can communicate with each other through a VCC. The recipient MT's base station first assembles the ATM cells into wireless data frames and then transmit the frames to the MTs according to the address.

The LE Version 1.0 Specification is based on wired LAN properties, which allows a conventional connection free (e.g., wireless) media-sharing network architecture to connect easily with a connection oriented (e.g., wired) ATM network.

It is an object of the present invention to provide a seamless handoff method for a mobile terminal in a WLAN.

It is another object of the present invention to provide a handoff method that reduces the delay caused by the VCC path elongation.

It is yet another object of the present invention to provide a WLAN emulation system for use in an existing LE environment to increase the LE environment's compatibility and real-time efficiency.

SUMMARY OF THE INVENTION

These and other objects of the invention are achieved by the present invention, which provides a seamless handoff satisfying the three rules set out above. An exclusive VCC is maintained between each two communicating work stations (MT pair). The handoff method differs if the MT moves to a coverage area having a base station connected to the same switch as the previous coverage area (intra-switch mobility) or to a coverage area having a base station connected to a different switch than the previous coverage area (inter-switch mobility).

In intra-switch mobility, the switch changes the path directly to the new base station and eliminates the path through the original base station. In inter-switch mobility, the switch performs the path set-up. The path may be elongated from the switch connected to the original BS, to the new BS, rather than from the original BS to the new BS. This eliminates the path through the original base station. The exclusive VCC between the MT pair permits path elongation to be minimized.

BRIEF DESCRIPTION OF THE DRAWINGS

The present invention is described with reference to the following figures:

FIG. 5a is a diagram illustrating the virtual paths and virtual channels of a preferred embodiment according the present invention during intra-switch mobility;

FIG. 5b is charts illustrating the contents of portions of an MVD and an SRD for the network of FIG. 5a;

FIG. 7b is charts illustrating the contents of portions of an MVD and an SRD for the network of FIG. 5a;

FIG. 8a is a diagram illustrating the virtual paths and virtual channels of a preferred embodiment according to the present invention after inter-switch mobility;

FIG. 8b is charts illustrating the contents of portions of an MVD and an SRD for the network of FIG. 8a.

FIG. 10b illustrates a switch interconnection configuration of the MAN architecture of FIG. 10a;

FIG. 11b illustrates the hop count of the inventive method during an identical simulation test as that shown in FIG. 11a;

FIG. 12b illustrates the hop count of the inventive method during the identical system simulation test shown in FIG. 12a.

Attached as Appendix A is a glossary of acronyms.

DETAILED DESCRIPTION OF A PREFERRED EMBODIMENT

Figures 3A, 3B:
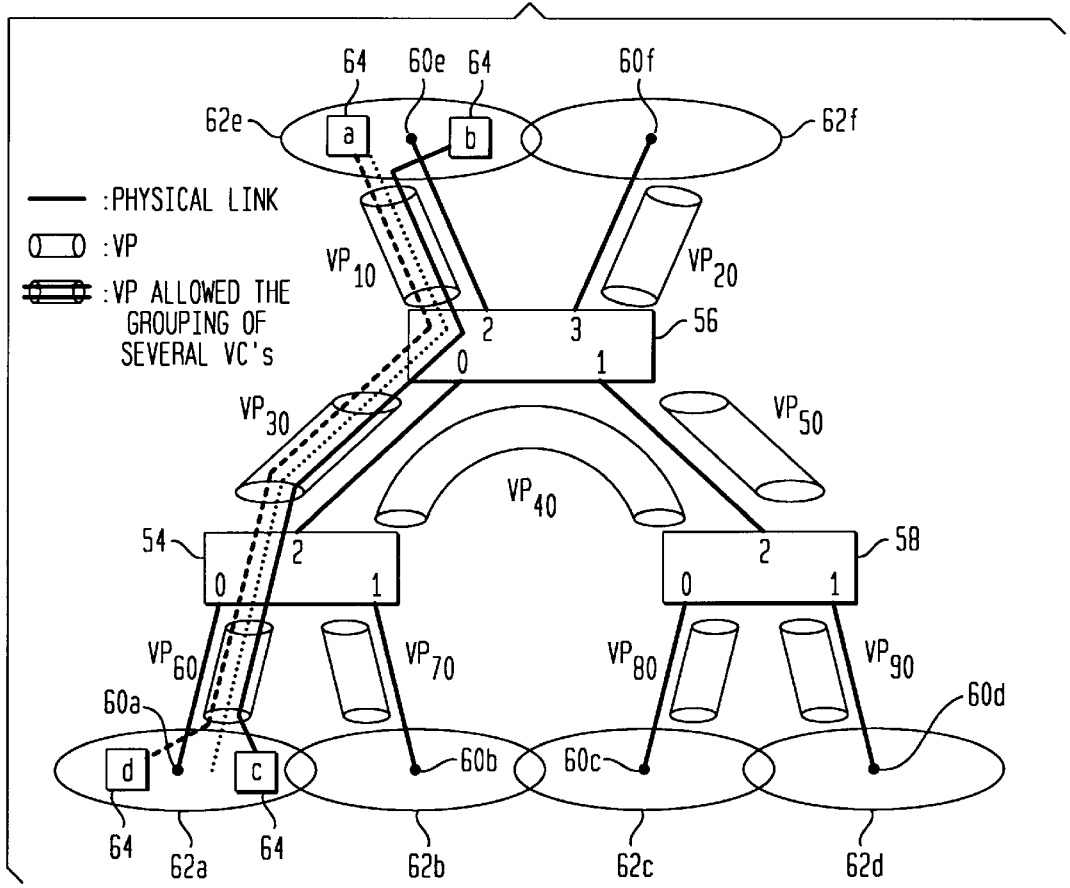
FIG. 3a is a diagram illustrating a preferred architecture and virtual paths and channels of a connected WLAN/LAN network according to the present invention.
FIG. 3b is charts illustrating the contents of portions of an MVD and an SRD for the network of FIG. 3a, FIG. 4 is a block diagram of a portion of the WLAN/LAN of FIG. 1 illustrating intra-switch mobility.

FIG. 3a illustrates a preferred architecture of a connected WLAN/LAN according to the present invention. Virtual paths (VPs) are defined for connections between each switch and for the connections between each switch and base station to which the switch is connected. Each VP is assigned a unique virtual path identifier (VPI). For example, the VP between BS 60e and switch 56 is uniquely identified as $VP_{10}$ and the VP between BS 60a and switch 54 is uniquely identified as $VP_{60}$. In a preferred embodiment, the VPI is an 8 bit field of a wireless frame or an ATM cell. These bits are used to route the communication to the proper location.

Using these virtual paths, a VCC is designated for each pair of workstations 64 (MT pairs). The VCC is maintained between the MTs and "follows" the MTs as they move to new coverage areas. FIG. 3a shows VCCs between two MTs (labeled a, b) currently located in coverage area 62e and two MTs (labeled c, d) currently located in coverage area 62a. The VCC between:

MTa and MTc (MT(a,c)) is shown as a dotted line;

MTb and MTc (MT(b,c)) is shown as a solid line; and

MTa and MTd (MT(a,d)) is shown as a dashed line.

As seen in FIG. 3a, at the current time the VCC for MT(a,c), for example, takes the following virtual path: $VP_{10}$ to $VP_{30}$ to $VP_{60}$.

Each segment of a VCC passing through a VP is uniquely identified by being paired with a unique random number called a Virtual Channel Identifier (VCI). Thus, in BS 60a, for example, the relevant portion of the VCCs may be expressed as:

MT(a,c)–$VP_{60}$/100;

MT(b,c)–$VP_{60}$/200; and

MT(a,d)–$VP_{60}$/300 where the second number in each pair is a randomly assigned VCI. In a preferred embodiment, the VCI is a 16 bit field in the wireless frame or ATM cell. These bits are used to route the communication to the proper location.

Each BS 60 maintains in a data base a record of each MT pair for MT's in its coverage area 62 and the corresponding VCC values. This database is called the MT pair—VCC database (MVD). The MVDs for BSs 60a and 60e are shown in FIG. 3b. When a BS receives a wireless transmission from an MT with corresponding values stored in the MVD, the BS will segment the wireless transmission frame into ATM cells. The ATM cells are transmitted to the proper network location using the VPI and VCI values stored in the MVD which provide a destination/source address pair in the transmission.

Each switch contains a database of the incoming and outgoing VPIs and switch I/O ports for each VCC going through that switch. This database is called the switch routing database (SRD). Partial SRDs for switches 54, 56 are shown in FIG. 3b. Six incoming VCCs for switch 54, for example, include three VCCs from BS 60a entering switch 54 via $VP_{60}$. Each of these three enters at port 0 and exits at port 2. Three VCCs enter switch 54 from switch 56 via $VP_{30}$. Each of these three enters at port 2 and exits at port 0. Note that the VCC values consist of the VPI ($VP_{30}$) and a VCI (e.g., random number 400, 500, or 600). Every entry in the SRD has four values, the IN-VCC, IN-PORT, OUT-VCC, and OUT-PORT.

The MVD and SRD databases are typically maintained in BSs and switches for network bridging and routing.

As seen in FIG. 3b, each BS and switch stores the relevant VCC information relative to that BS or switch. Thus, VCC changes due to mobility affecting only part of the entire VCC (i.e., a change in a base station only, or a base station and one switch only) requires changes only in the VCC values stored in the affected BS and/or switches.

The handoff method according to the present invention differs if the MT moves to a coverage area having a BS connected to the same switch as the previous coverage area (intra-switch mobility) or to a coverage area having a BS connected to a different switch than the previous coverage area (inter-switch mobility).

In intra-switch mobility, the switch changes the path directly to the new base station and deletes the path to the old base station. In inter-switch mobility, the switch performs the path set-up. For clarity, illustrative examples of intra- and inter-switch mobility are provided, followed by a description of the overall inventive method. Finally, test results supporting the efficacy of the present invention are presented.

A. An Example of Intra-Switch Mobility

Figure 4:
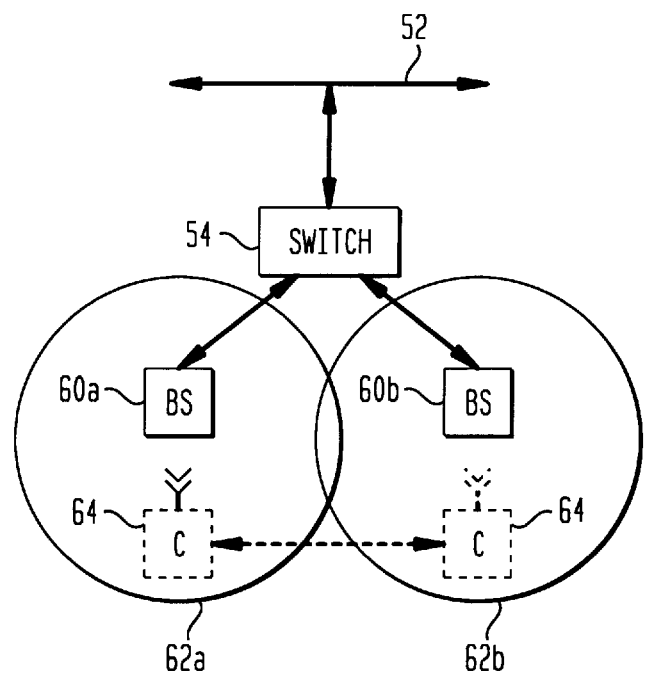

FIG. 4 provides an illustrative example of intra-switch mobility. FIG. 4 is a portion of the network shown in FIG. 1. In FIG. 4, the MT designated as "c" (MTc) moves from coverage area 62a (covered by BS 60a) to coverage area 62b (covered by BS 60b). MTc's original location and motion are shown in dashed lines. Both of these BSs are connected to switch 54, thus this is intra-switch mobility.

To handoff the VCC from BS 60a directly to 60b so that communications are routed to MTc at its new location, the following four control messages are generated:

1. Location message: the MT obtains the location of the new BS ($BS_{NEW}$) and sends it to the original BS ($BS_{ORIG}$);
2. Connection Message: the MT obtains the contents of the corresponding MT-pair VCC values from $BS_{ORIG}$ and sends it to $BS_{NEW}$.
3. Routing Message: $BS_{ORIG}$ issues a message to the connected switch through the handoff VC. This message includes the MT-associated VCCs; the location of $BS_{ORIG}$; and the location of $BS_{NEW}$ The switch can determine if the handoff is intra- or inter- switch according to the routing message. If the mobility is intra-switch, the switch alters the content of the SRD according to the MT associated VCCs and is able to switch paths inside the switch.
4. Complete Message: When the switch completes the path switching, it issues a message to $BS_{NEW}$ via the handoff VC containing the MT-associated VCCs.

Intra-switch mobility uses a handoff virtual channel. The handoff virtual channel is a predefined VPI/VCI value to process the handoff action. A handoff VPI/VCI value is defined to carry communications regarding the handoff. This virtual channel is used between a BS and switch or between switches.

FIGS. 5a and 5b provide an illustrative example of how these messages and channel are used during an intra-switch mobility handoff. FIG. 5a is the network of FIG. 3 with MTc now located in coverage area 62b, covered by BS 60b. Note that the exclusive VCCs for MT(a,c) and MT(b,c) have followed MTc. MTc issues a "location message" to BS 60a containing the location of BS 60b. MTc also issues a "connection message" to BS 60b containing MT(a,c)–$VP_{60}$/100; and MT(b,c)–$VP_{60}$/200.

BS 60a issues a "routing message" to switch 54 via the handoff virtual channel. The message contains:

$VP_{60}$/100;

$VP_{60}$/200;

ATM BS 60a; and

ATM BS 60b.

Switch 54 changes the SRD content of the MTc-associated VCCs to MT(a,c)–$VP_{70}$/100; and MT(b,c)–$VP_{70}$/200.

The VPIs are changed to reflect the altered VCC, but the VCIs associated with the changed VPI have not changed because the VCC between MT pairs is exclusive and should be identifiable regardless of MT mobility. Switch 54's updated SRD is shown in FIG. 5b. Switch 54 issues a "complete message" via the handoff VC. This message contains the new VCCs to BS 60b. BS 60b adds these new VCC values to its MVD and restarts the transmission process. Note that communications received from the LAN 52 to switch 54 addressed to MTc are not sent to $BS_{ORIG}$ and forwarded to $BS_{NEW}$. Rather, the communication is delivered directly to $BS_{NEW}$ because the SRD for switch 54 has been updated to reflect MTc's new location. BS 60b's MVD contents are shown in FIG. 5b.

Note that BS 60e's MVD and switch 56's SRD remain unchanged because MTc's move from BS 60a to BS 60b has not affected them, thus satisfying rule 2. During this handoff process, MTc temporarily stores the data it sends out and switch 54 temporarily stores the data it sends out. According to the present invention, there is no path elongation during intra-switch mobility. This satisfies rules 1 and 3.

B. An Example of Inter-Switch Mobility

Figure 1:
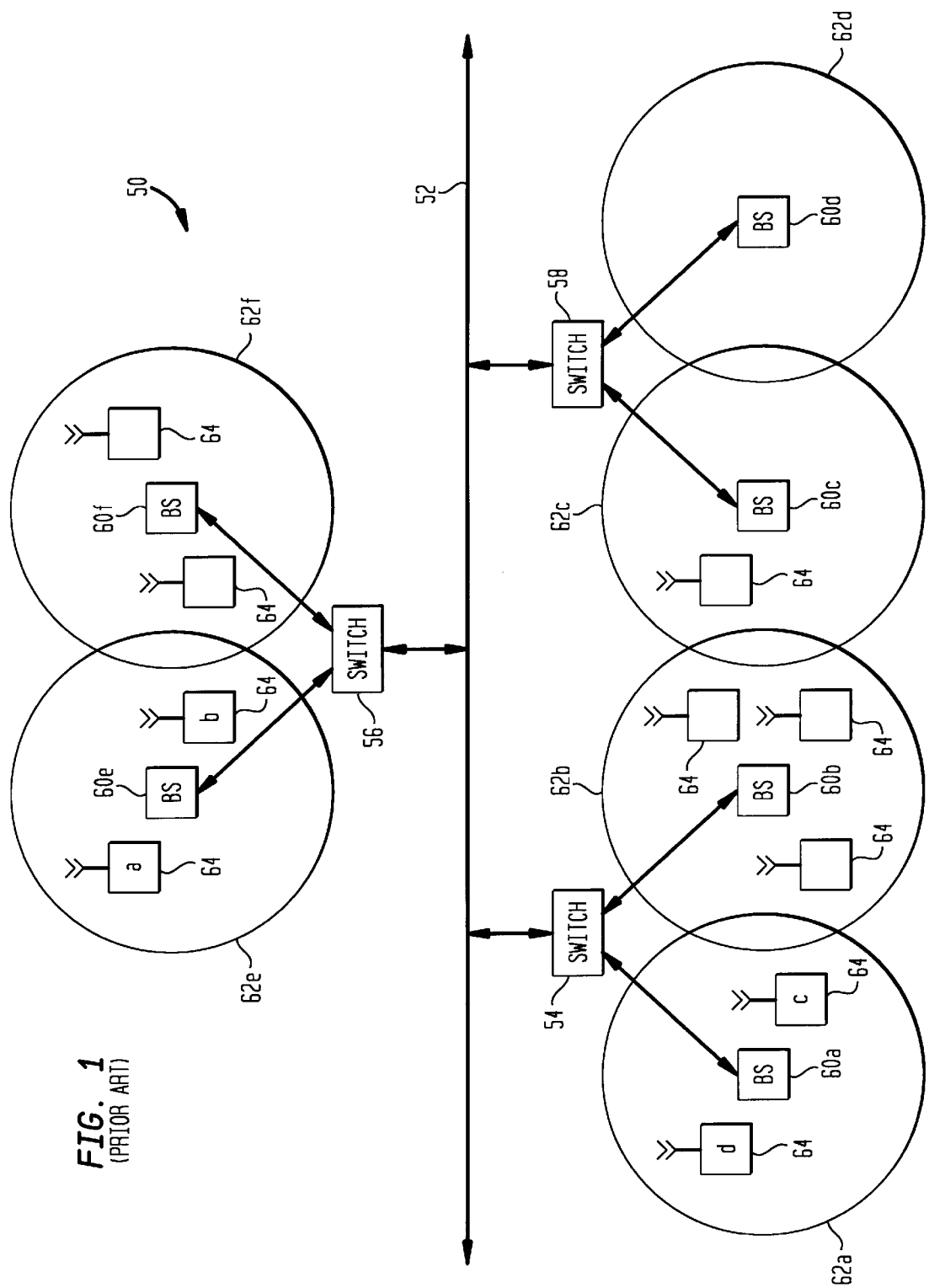
FIG. 1 is a block diagram of a WLAN connected with a wired LAN.
Figure 6:
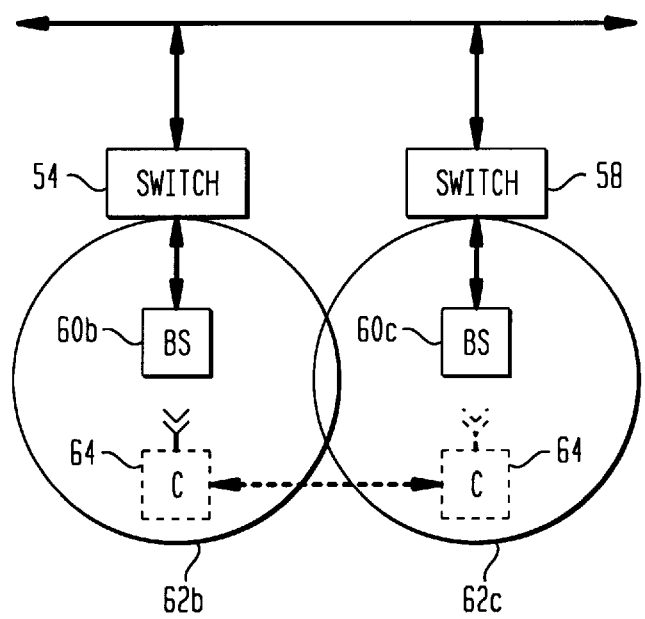
FIG. 6 is a block diagram of a portion of the WLAN/LAN of FIG. 1 illustrating inter-switch mobility.

FIG. 6 is a portion of the network shown in FIG. 1. In FIG. 6, MTc moves from coverage areas 62b (covered by BS 60b) to coverage area 62c (covered by BS 60c). These BSs are connected to different switches, thus this is inter-switch mobility. To handoff the VCC from BS 60b to BS 60c so that communications are correctly routed to MTc in its new location, a path elongation method is performed. The method according to the present invention, however, differs from the known methods described above.

Figure 2:
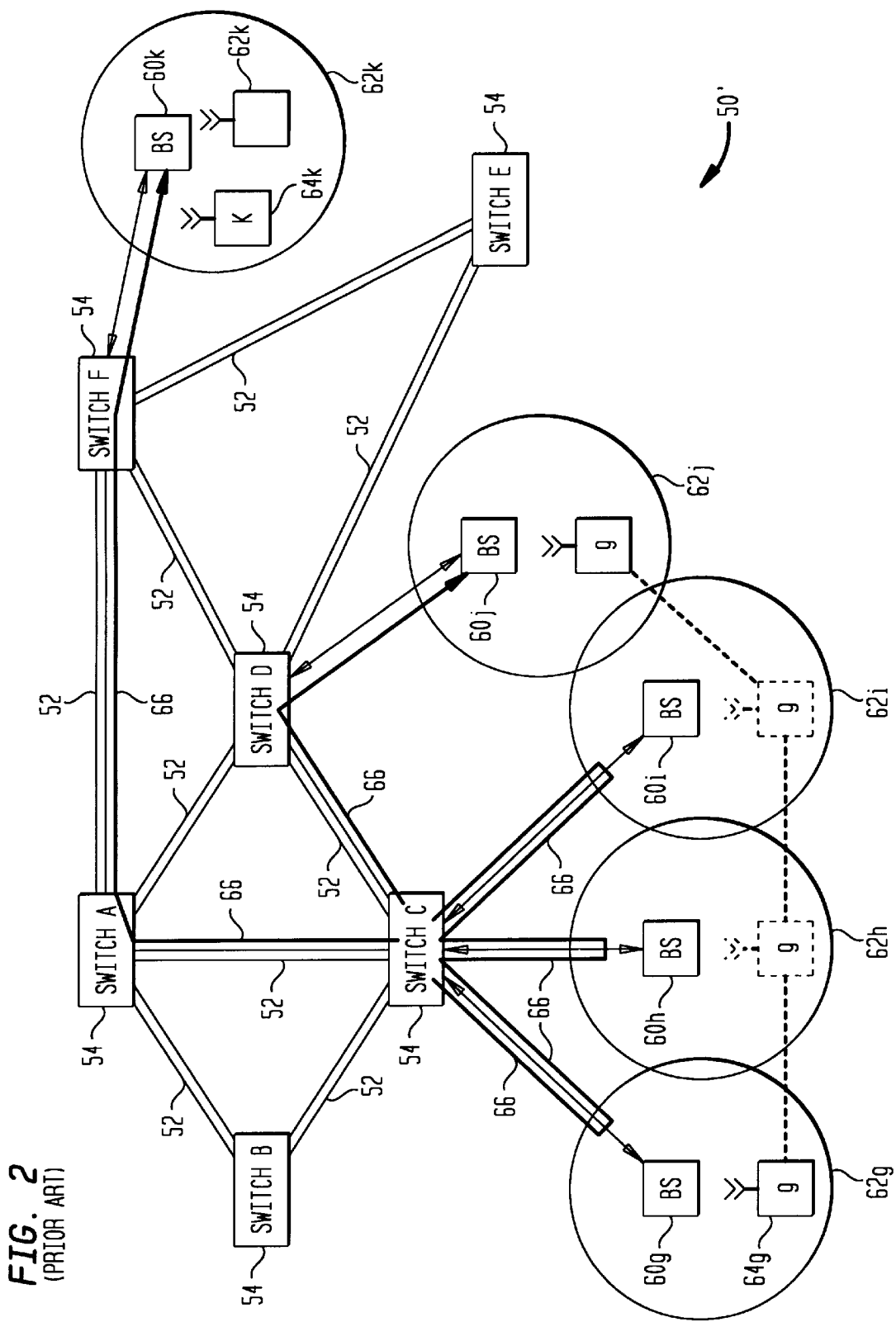
FIG. 2 is a block diagram of a WLAN connected with a wired LAN.

In the prior art, $BS_{ORIG}$ updated its MVD to receive and forward messages to $BS_{NEW}$. This results in the elongation paths as shown in FIG. 2. In the present invention, path elongation is minimized because the handoff is made from switch 54 to BS 60c, not from BS 60b to BS 60c. This avoids unnecessary frame-to-cell translation. In the known method, BS 60b would receive the communication, translate it into the frame format, determine that the communication is to be forwarded to another BS, and then translate the communication back to the cell format for forwarding along the LAN. This unnecessary translation is avoided in the present invention because the communication is never received by BS $60b$, but rather is sent directly to BS $60c$ by switch 54. Thus, not only is the elongated path shortened, the number of cell-to-frame translations is greatly reduced. The elongation process may be performed using, for example, the UNI/NNI protocol.

The inter-switch handoff uses the "location message", "connection message", and "routing message" discussed above. It also uses a "couple message" and a signaling virtual channel. When an elongated path from a previous switch to a new BS connected to another switch is set up, the switch issues a "couple message" to $BS_{NEW}$ through different elongated paths of the MT-associated VCCs. $BS_{NEW}$ will know the tuple $VCC_{ORIG}$ $VCC_{ELONGATED}$. $BS_{NEW}$ will also find out the correct tuple values of $MT_{PAIR}$-VCC ($MT_{PAIR}$ $VCC_{ORIG} \rightarrow VCC_{ELONGATED}$) through the "connection message". A signaling virtual channel (signaling VC) is used to dynamically set up connections between base stations. The signaling VC is used by the signaling protocol to send routing information and comprises a predefined VPI/VCI value. In this embodiment, the predefined bits are: the VPI field bit value is zero, and the VCI field bit value is 5 (e.g.,0000000000000101). A switched (demand) virtual connection (SVC) is a connection between two base stations that is dynamically established by signaling protocol.

Figure 7A:
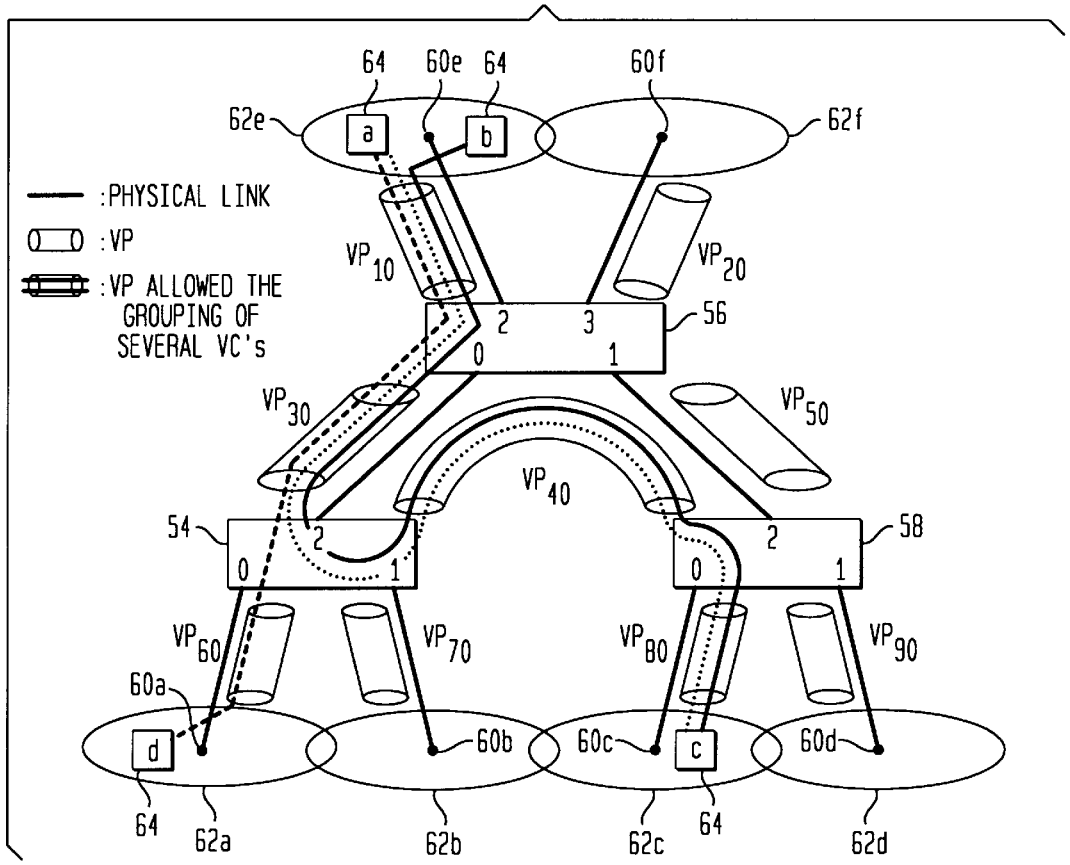
FIG 7a is a diagram illustrating the virtual paths and virtual channels of a preferred embodiment according the present invention during inter-switch mobility.
Figure 7B:
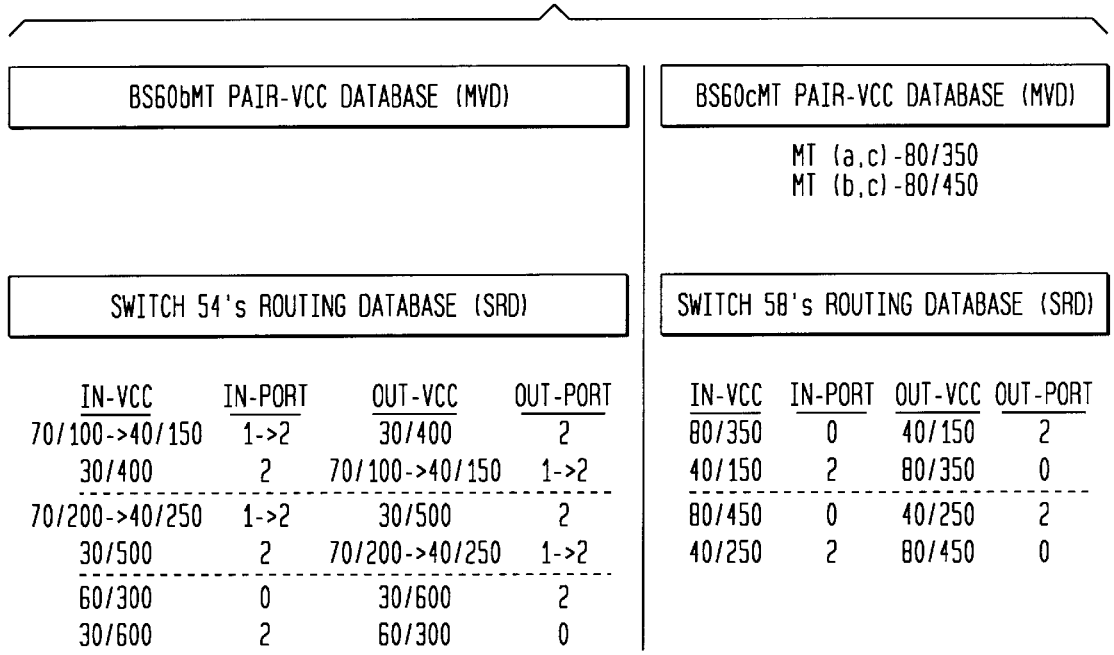

FIGS. 7a and 7b provide an illustrative example of how these messages and channels are used in an inter-switch handoff. FIG. 7a is the network of FIG. 3 with MTc now located in coverage area 62c, covered by BS 60c. BS 60c is connected to switch 58. Note that the VCCs for MT(a,c) and MT(b,c) have followed MTc.

MTc issues a "location message" to BS 60b containing the location of BS 60c. MTc simultaneously issues a "connection message" to BS 60c containing MT(a,c)–$VP_{70}$/100; and MT(b,c)–$VP_{70}$/200.

BS 60b issues a "routing message" to switch 54 via the handoff VC, The message contains:

$VP_{70}$/100;
$VP_{70}$/200;
BS 60b; and
BS 60c.

Switch 54 uses the signaling VC to set up an elongated path to BS 60c.

For each MT-associated VCC (in this illustration, $VP_{70}$/100 and $VP_{70}$/200), switch 54 establishes an elongated VCC to BS 60c, and it changes the content of its SRD. Switch 54 sends a "couple message" containing $VP_{70}$/100 and $VP_{70}$/200 to BS 60c. After receiving the "couple message". BS 60c and switch 58 update values in the MVD and SRD to reflect the mobility.

Note that communications received from the LAN 52 addressed to MTc are not sent to BS 60b and forwarded from switch 54 to switch 58 and BS 60c. Rather, after the path set-up, communications are sent to switch 54 and routed to switch 58. The VCC in Bs 60b is deleted. Switch 58 delivers the communications to BS 60c.

FIG. 7b shows the SRDs for switches 54 and 58, and the MVDs for BSs 60b and 60c. Note that BS 60a has no MT within its coverage area 62b, and that its corresponding MVD is empty.

Again, MTc's mobility does not affect MTa and MTb, thus meeting rule 2. The elongation path is from the switch to BS, not BS to BS, thus satisfying rule 3. However, there is an unnecessary loop where the signal both exits and enters switch 54 port 2 (e.g., the physical connection between switch 56 and switch 54 caused by $VP_{40}$ and $VP_{30}$). This loop is eliminated by the inventive method.

When switch 54 detects the loop by determining that its SRD includes the same port for the IN-PORT and the OUT-PORT, as seen in FIG. 7b, the switch 54 cancels the elongation path just established by the path set-up. The switch 54 issues a new "routing message" to switch 56 to delete the VCCs entering and exiting the loop to bypass switch 54. Switch 56 establishes a new elongation path and then inspects itself for loops. If a loop exists, the process is repeated.

Figures 8A, 8B:
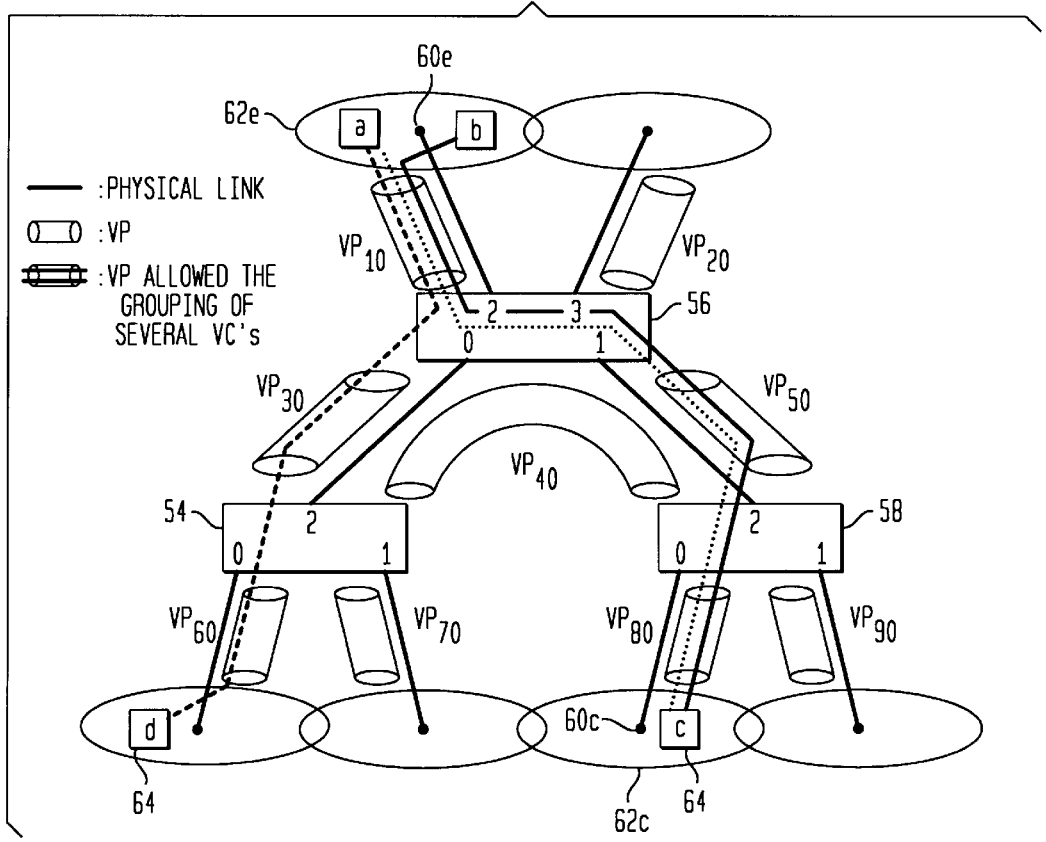

The revised VCCs, MVDs, and SRDs after the loop in switch 54 is eliminated are shown in FIGS. 8a and 8b. The result is a shorter elongation path and more efficient use of network bandwidth and other resources.

C. A Preferred Seamless Handoff Method

The parameters for a preferred handoff method according to the present invention are:

1. a mobile terminal MTa has number of $VCC_{k,a}$, each of which communicates with one of a number of $MT_k$, where k=1,2, . . . n;

2. MTa moves from coverage area $C_i$ to new coverage area $C_j$; and

3. Base station $BS_{ORIG}$ covers area $C_i$ and $BS_{NEW}$ covers area $C_j$.

For intra-switch mobility, $BS_{ORIG}$ and $BS_{NEW}$ are connected to the same switch. For inter-switch mobility, $BS_{ORIG}$ and $BS_{NEW}$ are connected to different switches.

Figure 9A:
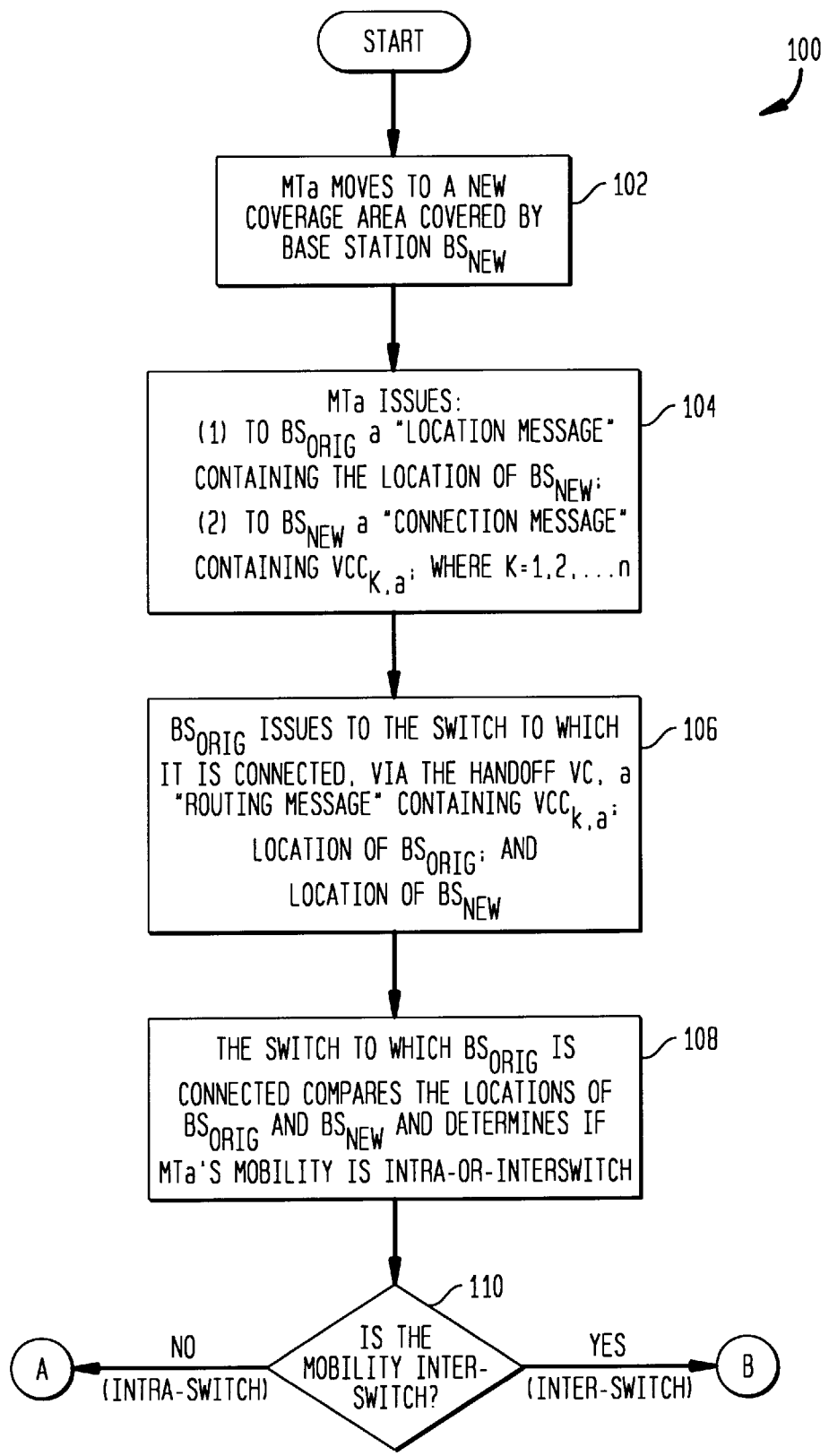
FIGS. 9a and 9b are a flow chart of a preferred method according to the present invention.
Figure 9B:
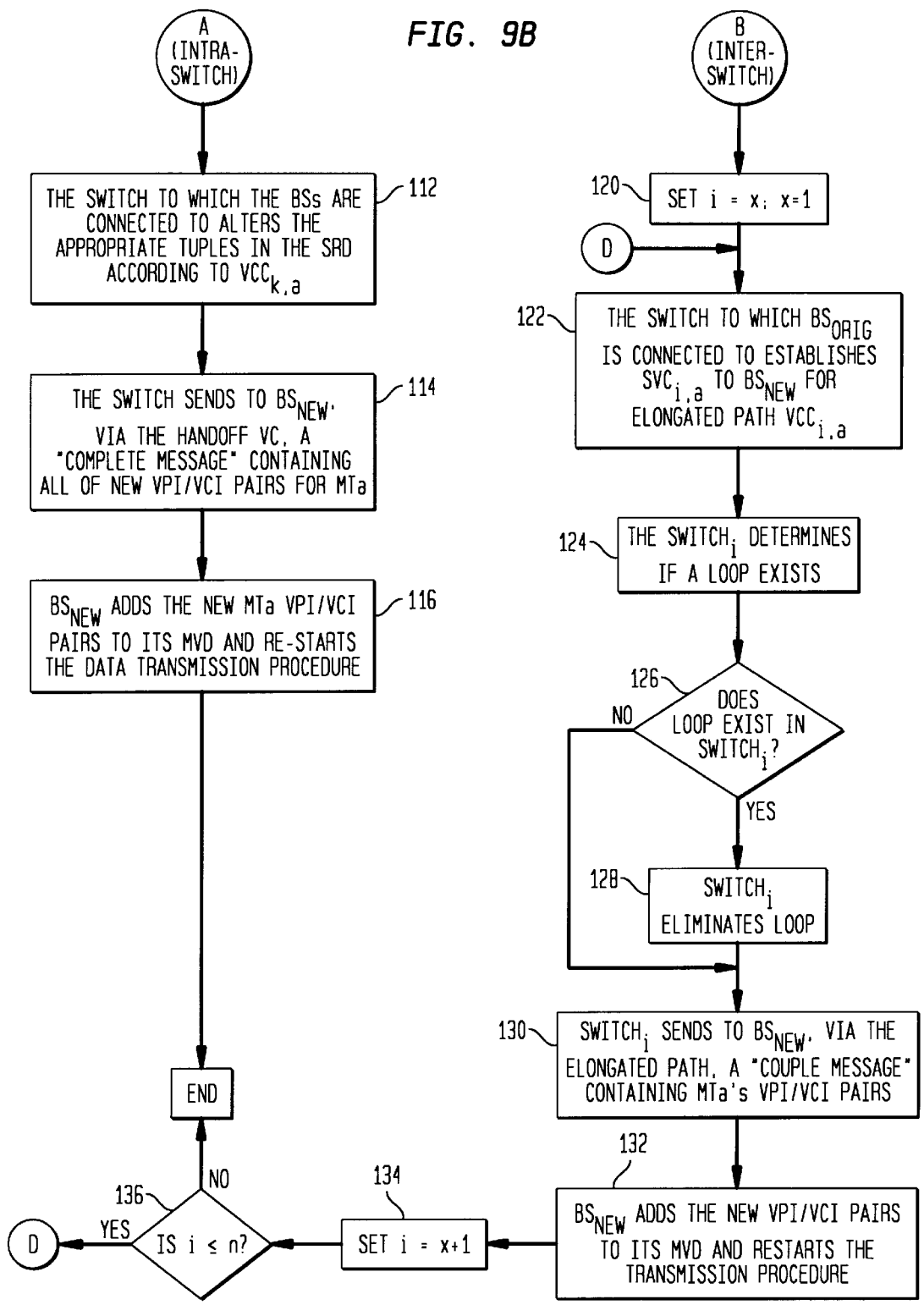

FIGS. 9a and 9b are a flow chart of a preferred handoff method 100 according to the inventive method. The preferred method begins when mobile terminal MTa moves from a previous coverage area $C_i$ covered by $BS_{ORIG}$ to a new coverage area $C_j$ covered by $BS_{NEW}$ (step 102). When this happens MTa issues two messages. It issues to $BS_{ORG}$ a "location message" containing the location of $BS_{NEW}$. It issues to $BS_{NEW}$ a "connection message" containing $VCC_{k,a}$, where k=1,2, . . . n (step 104). When $BS_{ORIG}$ receives the "location message", it issues to the switch to which it is connected, via of the handoff VC, a "routing message" containing $VCC_{k,a}$; the location of $BS_{ORIG}$; and the location of $BS_{NEW}$ (step 106). The switch to which $BS_{ORIG}$ is connected compares the location of $BS_{ORIG}$ and the location of $BS_{NEW}$ and determines if MTa's mobility is intra- or inter-switch (step 108).

If this mobility is intra-switch (step 110), the switch to which $BS_{ORIG}$ and $BS_{NEW}$ are connected alters the appropriate tuples in the SRD according to $VCC_{k,a}$ (step 112). The switch then sends to $BS_{NEW}$, via the handoff VC, a "complete message" containing all of the new VPI/VCI pairs for MTa (step 114). $BS_{NEW}$ then adds the new MTa's VPI/VCI pairs to its MVD and re-starts the data transmission procedure (step 116) without translating from the frame format into the ATM cell format.

If the mobility is inter-switch (step 110), then set parameter i=x and x=1 (step 120). The switch to which $BS_{ORIG}$ is connected be gins the path set-up and establishes a switched (demand) virtual connection ($SVC_{i,a}$) to $BS_{NEW}$ for elongated path $VCC_{i,a}$ (step 122). The switch determines if a loop exists in the SVC (step 124). If a loop exists (step 126), the switch revises the SVC to eliminate the loop (step 128). In any event, the switch sends to $BS_{NEW}$, via the elongated path, a "couple message", containing MTa's VPI/VCI pairs (step 130). $BS_{NEW}$ adds the new VPI/VCI pairs to it s MVD and re-starts the transmission procedure (step 132). The interval i is increased by one and repeated (steps 134, 136) until each VCC has been processed.

D. Test Results Using the Present Invention In a MAN Architecture

Figure 10A:
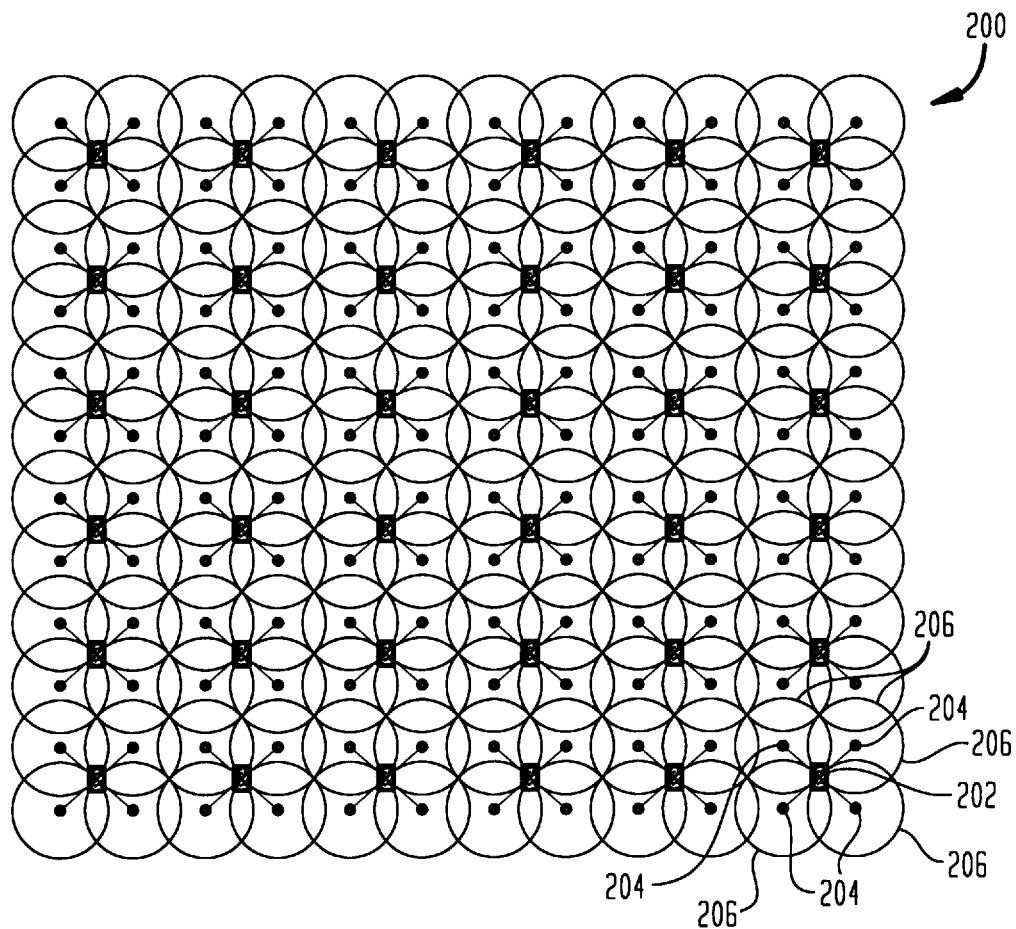
FIG. 10a illustrates a simulated MAN architecture used in a system simulation test of the present invention.
Figure 10B:
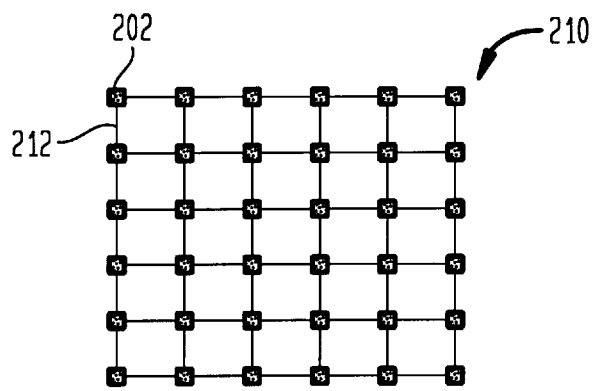

To verify the efficacy of the inventive method, the inventors conducted a computer simulated system test. FIG. 10a illustrates a simulated 12×12 Manhattan-style area network (MAN) 200 WLAN architecture used in the test. In the MAN architecture 200, each ATM switch 202 is connected to four base stations 204. Each base station 204 covers a coverage area 206. FIG. 10b illustrates the ATM switch 202 interconnection configuration 210. Adjacent switches 210 are physically connected by LAN lines 212. During the simulation, the shortest path routing is used to determine the connection between MTs. This means that there may be more than one VCC between two BSs. Here, the established route is determined by the path traversing the fewest switches. The routing efficiency is determined by the number of switches used to connect the MTs. This number is referred to as the "hop count".

Using this architecture, two experiments were run. In the first, connection establishment within a time unit is a Poisson distribution having an expectation value of E; the connection cutoff within the unit time is a Poisson distribution having an expectation value of R; the probabilities of a connection between any two MTs being established or cutoff are equal. In the second experiment, the number of VCCs established between MTs is constant. In both experiments, there are 144 MTs which can move randomly; only one VCC is permitted for each MT pair; and M indicates the percentage of user mobility within the unit time.

The results of the experiments were compared with the performance of a conventional LE with path elongation. The standard of comparison was the hop count between the two methods. The switch/BS connection is also considered a "hop" so that intra-switch mobility may also be considered in the comparison. Thus, the conventional method discussed above will require two additional hops over the present invention.

Figure 11A:
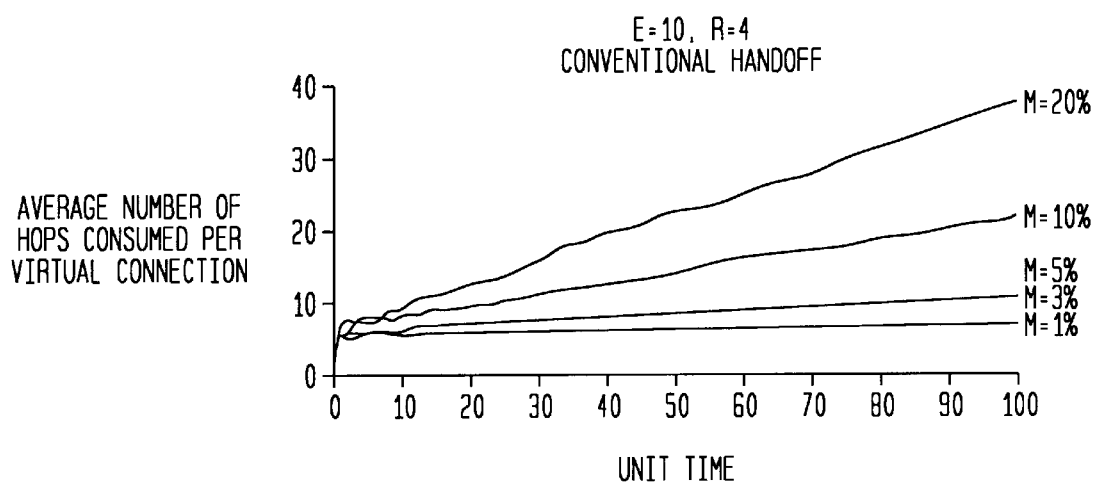
FIG. 11a illustrates the hop count of a conventional WLAN handoff method during a first system simulation test.
Figure 11B:
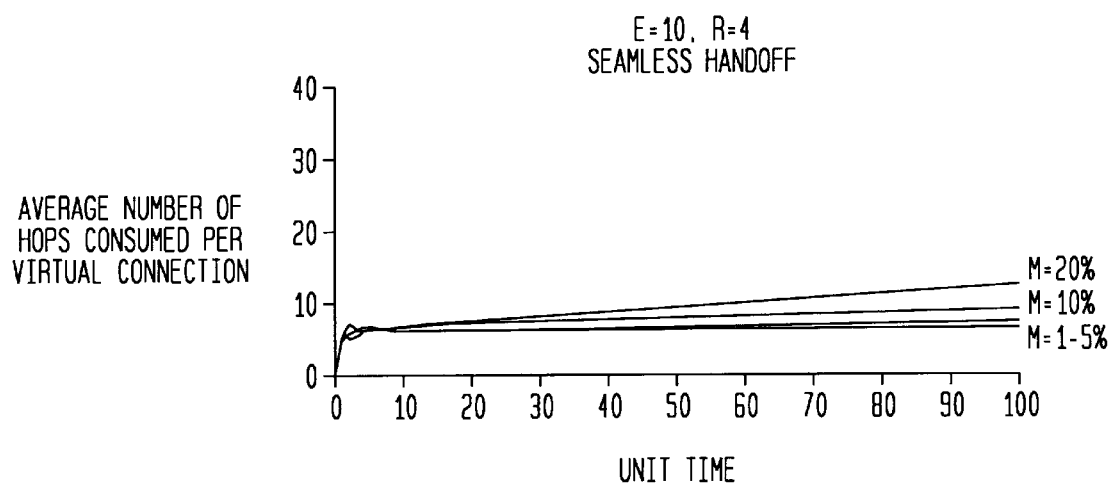

FIG. 11 illustrates the results of the first experiment where E=10; R=4; M ranges from 1%, 3%, 5%, 10%, and 20%; and the time=100 time units. FIG. 11a illustrates the hop count of the conventional method. The hop count per VCC increases exponentially with increasing time and increasing user mobility. FIG. 11b illustrates the hop count of the inventive method. The hop count per VCC does not increase exponentially, but rather increases only slightly with increasing user mobility. This indicates that the inventive method reduces the impact of MT mobility on LE service.

Figure 12A:
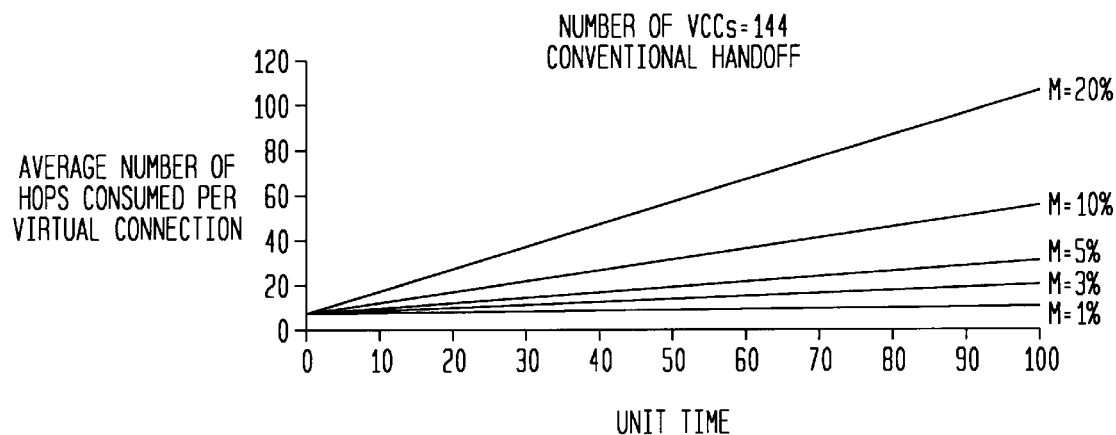
FIG. 12a illustrates the hop count of a conventional WLAN handoff method during a second system simulation test.
Figure 12B:
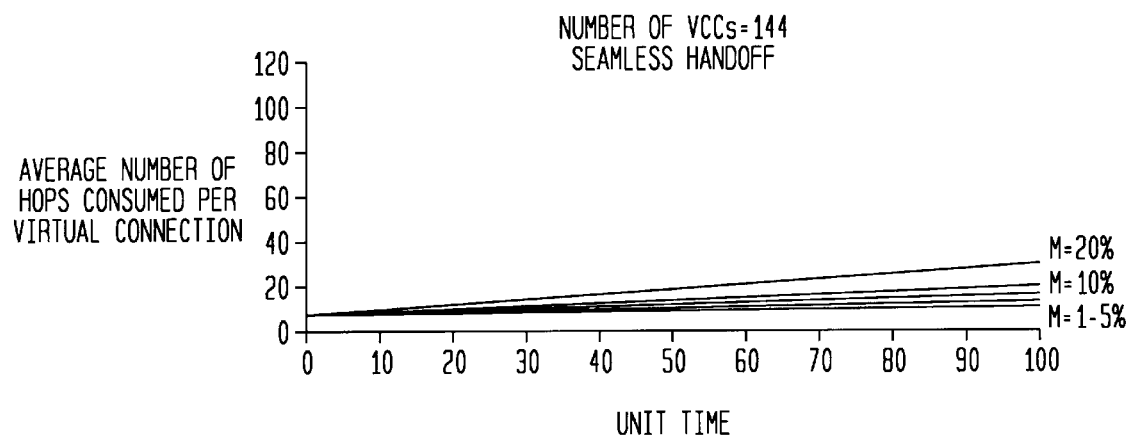

FIG. 12 illustrates the results of the second simulation to where the number of VCCs is fixed at 144. FIG. 12a illustrates the hop count of the conventional method. Again, the hop count per VCC increases exponentially with increasing time and increasing user mobility. FIG. 12b illustrates the hop count of the inventive method and increasing time and increasing user mobility. The hop count per VCC does not increase exponentially, but rather increases only slightly. Again, the bandwidth efficiency of the inventive method is seen.

A seamless handoff method for a WLAN connected to a wired LAN is shown which results in efficient use of network resources. The seamless handoff method of the present invention uses a distributed network architecture suitable for use in large scale networks such as metropolitan area networks and wide area networks. The above described embodiment of the invention is intended to be illustrative only. Numerous alternative embodiments may be devised by those skilled in the art without departing from the spirit and scope of the following claims.

APPENDIX A
Glossary of Acronyms:

| | |
|---|---|
| ATM | Asynchronous Transfer Mode |
| BS | Base Station |
| LAN | Local Area Network |
| LE | Local Area Network Emulation |
| MAN | Manhattan-style Area Network |
| MT | Mobile Terminal |
| MVD | Mobile Terminal Pair Virtual Channel Connection Database |
| SRD | Asynchronous Transfer Mode Switch Routing Database |
| SVC | Switched (Demand) Virtual Connection |
| VCC | Virtual Channel Connection |
| VCI | Virtual Channel Identifier |
| VP | Virtual Path |
| VPI | Virtual Path Identifier |
| WLAN | Wireless Local Area Network |

We claim:

1. A handoff method for a wireless local area network servicing at least two mobile terminals, when a first mobile terminal moves from a first coverage area covered by a first base station connected to a switch to a second coverage area covered by a second base station connected to the same switch, the method comprising the steps of:

a. the first mobile terminal issuing to the first base station a location message containing the location of the second base station;

b. the first mobile terminal issuing to the second base station a connection message containing virtual channel connections for the first mobile terminal;

c. the first base station issuing a routing message containing the location of the first and second base stations and the virtual channel connections for the first mobile terminal;

d. the switch altering the virtual channel connections for the first mobile terminal to reflect the move to the second coverage area; and e. the switch issuing to the second base station a complete message containing the altered virtual channel connections for the first mobile terminal.

2. The method of claim 1, wherein the step of altering comprises eliminating the first base station from the virtual channel connection.

3. A handoff method for a wireless local area network servicing at least two mobile terminals, when a first mobile terminal moves from a first coverage area covered by a first base station connected to a first switch to a second coverage area covered by a second base station connected to a second switch, the first and second switches connected by a local area network, the method comprising the steps of:

a. the first mobile terminal issuing to the first base station a location message containing the location of the second base station;

b. the first mobile terminal issuing to the second base station a connection message containing virtual channel connections for the first mobile terminal;

c. the first base station issuing a routing message containing the location of the first and second base stations and the virtual channel connections for the first mobile terminal;

d. the first switch issuing, via the second switch, to the second base station a couple message containing the virtual channel connections for the first mobile terminal; and e. the first switch updating the virtual channel connections for the first mobile terminal to reflect the move to the second coverage area.

4. The method of claim 3, further comprising the step of after issuing the routing message, establishing a switched virtual connection to the second base station.

5. The method of claim 3, wherein before the step of issuing the couple message:

a. determining if a loop exists in the first switch; and b. if a loop is determined to exist, eliminating the loop.

6. The method of claim 5, wherein the steps of determining and eliminating are performed for a plurality of switches.

7. A handoff method for a wireless local area network servicing at least two mobile terminals, and having at least two base stations and at least two switches; each mobile terminal being in wireless communication with a base station covering a coverage area, each base station being connected to a switch, and the switches being connected by a wired local area network (LAN), the method comprising the steps of:

a. designating a virtual channel connection (VCC) between a first and a second mobile terminal; and b. altering the VCC between the first and second mobile terminals when the second mobile terminal moves from a first base station to a second base station, where:

(1) if the first and second base stations are connected to the same switch, altering the VCC in the first switch, deleting the VCC in the first base station, and adding the altered VCC in the second base station; and (2) if the first and second base stations are connected to a first and a second switch, respectively, establishing an elongated path by:

1. creating a switched virtual connection (SVC) from the first base station to the second base station via the first and second switches;

2. deleting the VCC in the first base station, 3. after deleting the VCC in the first base station, determining if a loop exists in a switch in the SVC;

4. if a loop is determined to exist in a switch, eliminating the loop;

5. altering the VCC to delete the eliminated loop; and 6. sending to the second base station a couple message containing the VCC for the second mobile terminal.

8. The method of claim 7, wherein steps 3–5 are repeated for a plurality of switches.

* * * * *